US010902051B2

(12) United States Patent
Hu et al.

(10) Patent No.: US 10,902,051 B2
(45) Date of Patent: Jan. 26, 2021

(54) PRODUCT IDENTIFICATION IN IMAGE WITH MULTIPLE PRODUCTS

(71) Applicant: Microsoft Technology Licensing, LLC, Redmond, WA (US)

(72) Inventors: Houdong Hu, Redmond, WA (US); Li Huang, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 39 days.

(21) Appl. No.: 15/954,152

(22) Filed: Apr. 16, 2018

(65) Prior Publication Data

US 2019/0318405 A1 Oct. 17, 2019

(51) Int. Cl.
*G06F 16/00* (2019.01)
*G06F 16/55* (2019.01)
(Continued)

(52) U.S. Cl.
CPC ........... *G06F 16/55* (2019.01); *G06F 3/0482* (2013.01); *G06F 3/04842* (2013.01); *G06F 16/53* (2019.01); *G06F 16/532* (2019.01); *G06K 9/6267* (2013.01); *G06K 9/66* (2013.01); *G06N 3/08* (2013.01); *G06N 20/00* (2019.01); *G06Q 30/0625* (2013.01); *G06Q 30/0641* (2013.01)

(58) Field of Classification Search
CPC ................... G06F 16/58; G06F 16/50; G06Q 30/0601–0645
See application file for complete search history.

(56) References Cited

U.S. PATENT DOCUMENTS

2015/0235389 A1* 8/2015 Miller ............... G06Q 30/0627
345/594
2016/0042250 A1* 2/2016 Cordova-Diba .......... G06T 5/00
382/180
(Continued)

OTHER PUBLICATIONS

"Chen, Luyang, 'Image-based Product Recommendation System with Convolutional Neural Networks', Oct. 2017, online, Available: http://cs231n.stanford.edu/reports/2017/pdfs/105.pdf, PDF pp. 1-7" (Year: 2017).*
(Continued)

*Primary Examiner* — William J Allen
*Assistant Examiner* — Maria S. P. Heath
(74) *Attorney, Agent, or Firm* — Medley, Behrens & Lewis, LLC

(57) ABSTRACT

Methods, systems, and computer programs are presented for identifying the brand and model of products embedded within an image. One method includes operations for receiving, via a graphical user interface (GUI), a selection of an image, and for analyzing the image to determine a location within the image of one or more products. For each product in the image, determining a unique identification of the product is determined, the unique identification including a manufacturer of the product and a model identifier. The method further includes an operation for presenting information about the one or more products in the GUI with a selection option for selecting each of the one or more products. Additionally, the method includes operations for receiving a product selection for one of the one or more products, and presenting shopping options in the GUI for purchasing the selected product.

19 Claims, 11 Drawing Sheets

(51) Int. Cl.
     *G06Q 30/06*     (2012.01)
     *G06N 3/08*      (2006.01)
     *G06F 3/0482*    (2013.01)
     *G06F 3/0484*    (2013.01)
     *G06K 9/66*      (2006.01)
     *G06K 9/62*      (2006.01)
     *G06N 20/00*     (2019.01)
     *G06F 16/532*    (2019.01)
     *G06F 16/53*     (2019.01)

(56) References Cited

U.S. PATENT DOCUMENTS

2018/0107902 A1* 4/2018 Yang ................... G06K 9/623
2019/0080207 A1* 3/2019 Chang .................. G06N 3/08

OTHER PUBLICATIONS

Fu, Jianlong, et al., "Look Closer to See Better: Recurrent Attention Convolutional Neural Network for Fine-grained Image Recognition", In IEEE Conference on Computer Vision and Pattern Recognition (CVPR), Jul. 21, 2017, pp. 4438-4446.

* cited by examiner

PRODUCT IDENTIFICATION IN IMAGE WITH MULTIPLE PRODUCTS

TECHNICAL FIELD

The subject matter disclosed herein generally relates to methods, systems, and programs for identifying products embedded within an image and, more particularly, methods, systems, and computer programs for identifying the brand and product identifier of the products within the image.

BACKGROUND

Visual searching for images has gained popularity, showing explosive growth due to the large number of pictures generated by people and the increasing number of images provided on news and information websites.

Photos of celebrities or fashion models wearing high fashion products is a popular visual search area for many fashion-conscious users. These users want to know the exact product information for the items worn by celebrities and fashion models, and how to purchase these items.

However, existing visual search engines only return visually-similar images that often correspond to similar items, but that are not an exact match for the item. For example, if a celebrity is wearing a dress, the visual search may return dresses that look similar, but most times the visual search will not return the exact dress and will not provide purchase information.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
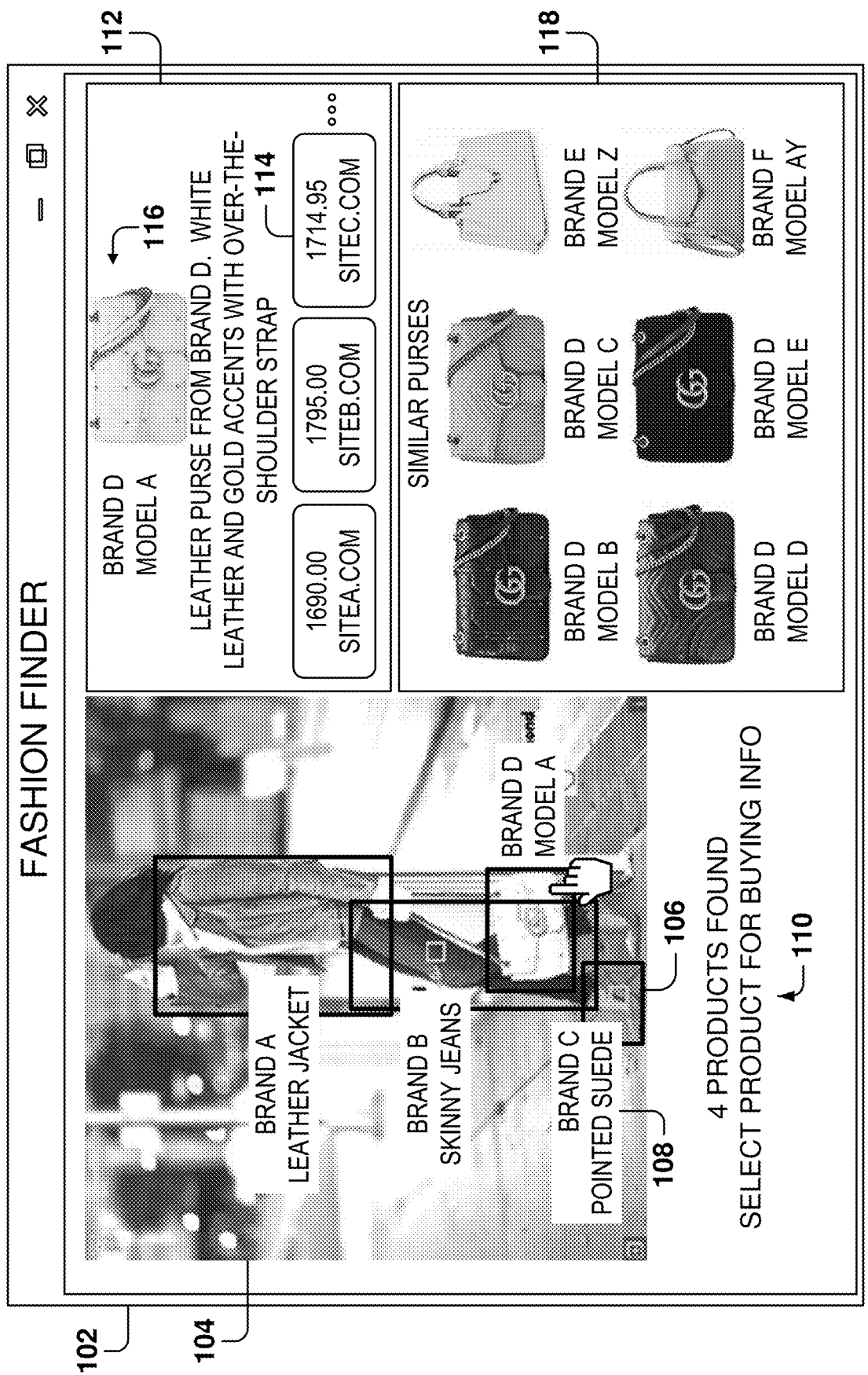
FIG. 1 is a user interface for finding products inside an image, according to some example embodiments.

Example methods, systems, and computer programs are directed to identifying the brand and model of products embedded within an image. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In some implementations, a novel user interface is provided for selecting images for analysis to identify commercial products embedded in the images and to provide shopping options to buy the exact identified products. Additionally, browsing options are provided for checking similar products to those identified in the images. Implementations are presented with reference to fashion searches, but the same principles may be applied to products in other fields, such as sports, technology, games, home improvement, automotive parts, and other specialty product areas.

Given a user-uploaded or selected street-style fashion image, the product-recognition program recognizes the exact products in the images. For example, the product-recognition program may identify the brand and model of jacket, shirt, hat, pants, gloves, and shoes worn by a celebrity. The user may select one of the identified products and the product-recognition program provides shopping options of commercial websites where the user may purchase the product of interest. Additionally, the user may browse for similar products (e.g., other products from the same manufacturer or similar products from other manufacturers).

Conventional systems perform a visual search on just one item (e.g., a purse) to identify similar items (e.g., similar purses), but such conventional systems may not identify multiple products and do not give an exact match for the product.

In some implementations, the product-recognition technology is based on deep convolutional neural networks. A high-level fashion-object-detection model is used to detect bounding boxes within the image for one or more fashion objects. A fine-grained classification model may be used to recognize the product. If the image being searched is from the web, the web page metadata may also be leveraged to further improve product recognition accuracy.

In one embodiment, a method is provided. The method includes an operation for receiving, via a graphical user interface (GUI), a selection of an image. The method further includes operations for analyzing the image to determine a location within the image of one or more products, and, for each product in the image, determining a unique identification of the product that includes a manufacturer of the product and a model identifier. The method further includes an operation for presenting information about the one or more products in the GUI with a selection option for selecting each of the one or more products. After a product selection is received for one of the one or more products, shopping options are presented in the GUI for purchasing the selected product.

In another embodiment, a system includes a memory comprising instructions and one or more computer processors. The instructions, when executed by the one or more computer processors, cause the one or more computer processors to perform operations comprising: receiving, via a GUI, a selection of an image; analyzing the image to determine a location within the image of one or more products; for each product in the image, determining a unique identification of the product that includes a manufacturer of the product and a model identifier; presenting information about the one or more products in the GUI with a selection option for selecting each of the one or more products; receiving a product selection for one of the one or more products; and presenting shopping options in the GUI for purchasing the selected product.

In yet another embodiment, a non-transitory machine-readable storage medium includes instructions that, when executed by a machine, cause the machine to perform operations comprising: receiving, via a GUI, a selection of an image; analyzing the image to determine a location within the image of one or more products; for each product in the image, determining a unique identification of the product that includes a manufacturer of the product and a model identifier; presenting information about the one or more products in the GUI with a selection option for selecting each of the one or more products; receiving a product selection for one of the one or more products; and presenting shopping options in the GUI for purchasing the selected product.

FIG. 1 is a user interface 102 for finding products within an image 104, according to some example embodiments. A user may select an image found on a website or a social network, or select an image taken with the user's camera. The user may select the image in multiple ways, such as by selecting a file with image data (also referred to as image content), accessing a special menu for product recognition (e.g., by right clicking on an image in the browser), placing the image on the clipboard, entering a webpage address on a field within the product-recognition program, verbally referencing an image (e.g., "that photo I took last night," or "Rhianna at the 2017 Grammys"), etc.

After the user selects the image, the fashion-finder user interface 102 is presented, according to some example embodiments. Initially, image 104 is presented and the product-recognition program then analyzes the image to identify embedded products. In the example of FIG. 1, four products have been identified in image 104: a jacket, pants, a purse, and a pair of shoes.

In some example embodiments, a bounding box 106 is placed around each identified item as well as a product description 108 (e.g., Brand A leather jacket). More details are provided below with reference to FIG. 8 regarding the calculation of the bounding boxes. Further, an information message 110 indicates that four products have been found and prompts the user to select one of the identified products for obtaining additional information, such as product details and buying information.

After the user selects one of the products (e.g., the purse), a detailed shopping window 112 shows information about the selected item and buying options 114. The detailed shopping window 112 includes an image 116 of the item, a product identifier (e.g., Brand D, Model A), a description of the item (e.g., leather purse from Brand D, white leather and gold accents with over-the-shoulder strap), and buying options 112. The product identifier uniquely defines the product among all identifiable products. In some example embodiments, the product identifier includes, at least, a manufacturer identifier, and a model identifier. The manufacturer identifier uniquely identifies the maker of the product, and the model identifier uniquely identifies the product from all other products manufactured by the same manufacturer. In other example embodiments, other product identifiers may be utilized, such as a barcode.

In some example embodiments, the buying options 112 provide a list of websites where the item may be purchased (including a website name and a web address) and the corresponding price of the item. If the user selects one of the buying options 112, a web browser will open the webpage for the selected commerce website. In other example embodiments, if the user selects one of the buying options 112, a custom shopping application (e.g., a shopping application installed on a mobile device) may be opened to show the selected product.

Additionally, a similar-product window 118 presents products that are similar to the selected item. For example, the similar-product window 118 includes a plurality of similar purses from the same manufacturer, and/or similar purses from other manufacturers. If the user selects one of the similar items, the buying options window 112 will be updated with the details of the selected similar item. A similar item is an item with one or more comparable characteristics as the product. For example, the characteristics may include any combination of shape, color, size, ornamentation, or other product-specific features, such as, for a purse, type of strap, closing mechanism, gold or silver accents, hand purse vs. over-the-shoulder strap purse, etc.

In some example embodiments, the product-recognition program utilizes visual searches for identifying the exact product. The product-recognition program utilizes machine-learning programs for finding the exact product based on a database of labeled images. A product may look different from different angles, so the visual search must be able to identify the product, independent of the position of the product within the image. It is noted that any image may be scanned for product recognition, and not just clean isolated images of products, such as those found on a shopping website or a catalog. Therefore, it is possible to use any type of image for product identification, and the visual search capabilities of the product-recognition program enable the recognition of the unique products within the image.

By identifying the product, the product-recognition program is able to recognize the designer (e.g., maker of the product) as well as the style (e.g., over-the-shoulder strap purse). In some example embodiments, the user interface 102 provides an option (not shown) for browsing other products of the manufacturer of the selected product.

Figure 2:
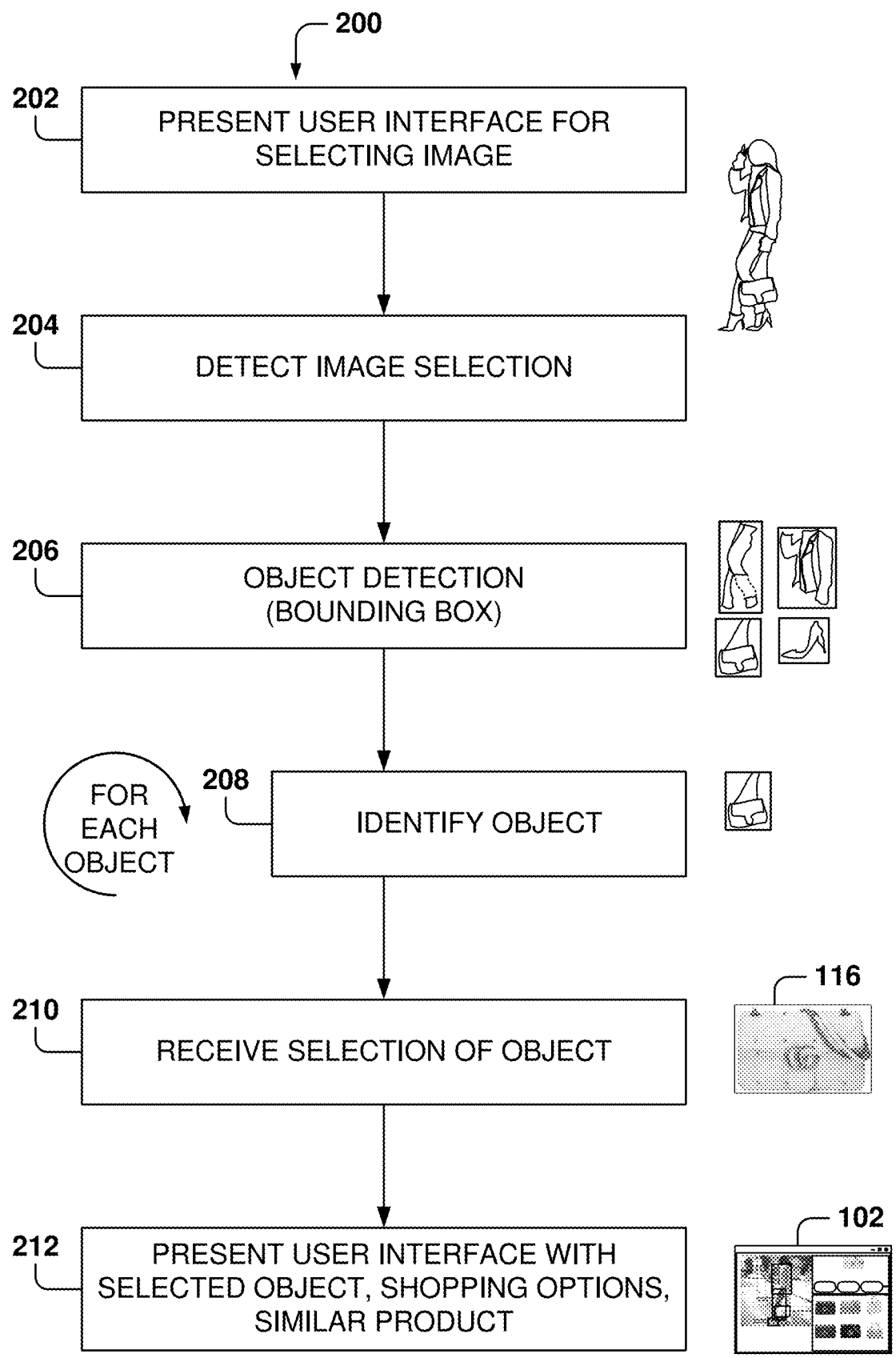
FIG. 2 is a flowchart of a method for identifying products, according to some example embodiments.

FIG. 2 is a flowchart of a method 200 for identifying products, according to some example embodiments. While the various operations in this flowchart are presented and described sequentially, one of ordinary skill will appreciate that some or all of the operations may be executed in a different order, be combined or omitted, or be executed in parallel.

At operation 202, a user interface is presented for selecting an image. The user interface may include a web browser, a photo gallery program, a file directory with images, microphone and speakers, a camera, etc. Embodiments are presented with reference to a GUI interface, but a speech interface may also be utilized where the user enters verbal commands for identifying an image and the fashion finder may reply with verbal information regarding the identified product or products. The user may then enter verbal commands for gaining more information about the identified products or shopping for the products. In some example embodiments verbal commands may also be used when using a display for information presentation.

For example, a user may request verbally, "Hey Cortana, what did Rhianna wear to the Grammys last year?" The fashion finder may perform the image search, select one image of the singer at the Grammys, and proceed to identify the products in the image, "Rhianna was wearing an X dress, Y shoes, and a Z handbag." The user may then ask, "How much are the Y shoes," and the fashion finder will list shopping options, "You may purchase the Y shoes at shopping website W1 for 650, website W2 for 675, and website W3 for 799." The user may then command, "Okay, Cortana, order Y shoes, size 8, from website W1." The purchase could be executed using a default shopping app assigned by the user, based on a profile of the user in the fashion finder that includes buying information (e.g., credit card information, shipping address), or the user may be prompted for additional information to purchase on the selected website.

From operation 202, the method flows to operation 204 where the product-recognition program detects the image selection for product recognition search.

From operation 204, the method flows to operation 206 where the one or more objects (e.g., products) are identified. For example, the jacket, pants, purse, and shoes are detected in image 104 of FIG. 1. In one example embodiment, the object detection for embedded products in the image is performed by a machine-learning program (MLP), such as a deep neural network (DNN), but other object-detection methods may be utilized. More details are provided below with reference to FIG. 8 regarding methods for object detection within an image.

From operation 206, the method flows to operation 208 where each of the objects found at operation 206 are identified. The user interface is then updated with information for each of the objects (e.g., brand, model, description). In some example embodiments, the object identification is performed by a second DNN classifier. The second DNN classifier uses the image data within the corresponding bounding box of the item as the input in order to perform the item search.

There are several methods for identifying objects. A first method includes using fine-grained product classification methods, such as bi-linear pooling and attention-based methods. A second method is a retrieval-based method based on image searching, using the given image as the query image in a human-labelled fashion product database using DNN encoders, and then retrieving the top n results from the database. Majority voting is then used on the top n results to determine the product identity. A third method utilizes an MLP for object detection in order to recognize the exact product and the corresponding associated information, such as product description and seller options.

In addition, any combination of the three methods may be utilized for object identification. More details are provided below on the methodology of these methods.

From operation 208, the method flows to operation 210 where a selection is received of one of the identified objects within the image. At operation 212, the user interface 102 is updated with information about the selected object, shopping options, and similar products, as illustrated above in FIG. 1.

Figure 3:
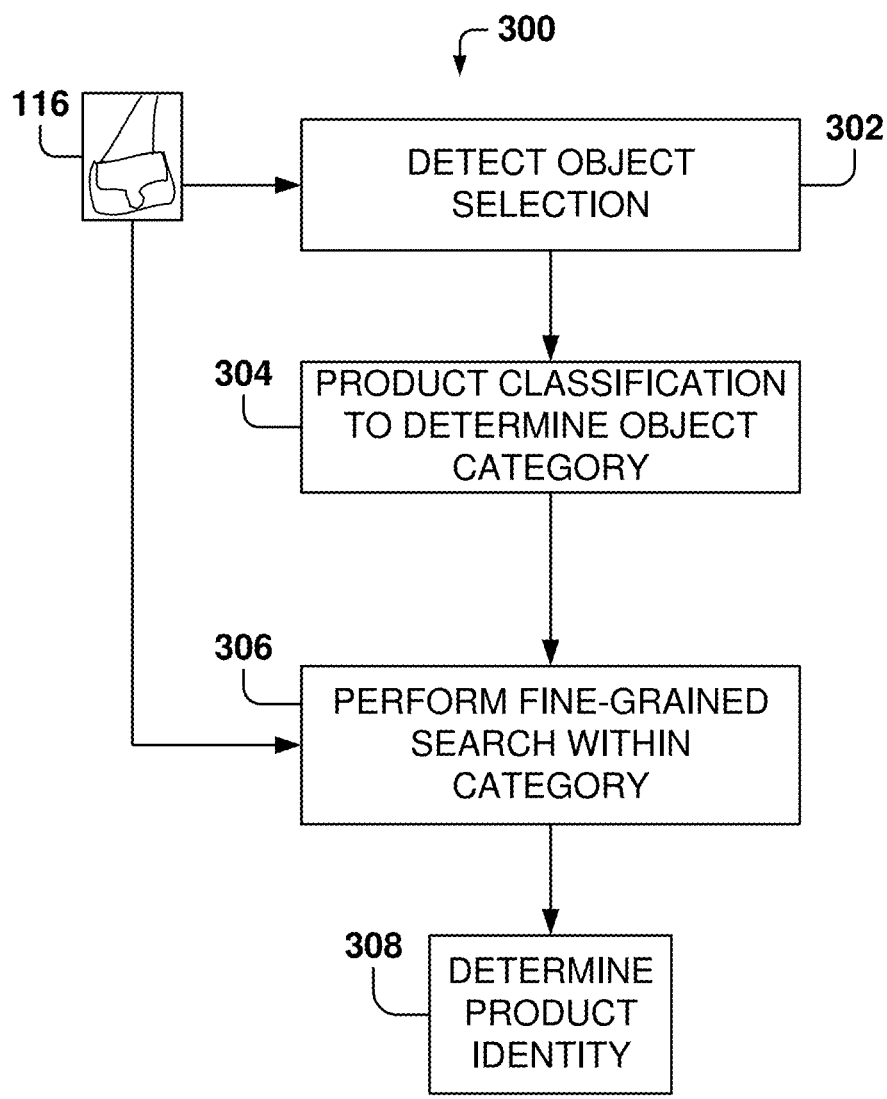
FIG. 3 is a flowchart of a method for identifying products based on fine-grained product categorization, according to some example embodiments.

FIG. 3 is a flowchart of a method 300 for identifying products based on fine-grained product categorization, according to some example embodiments. While the various operations in this flowchart are presented and described sequentially, one of ordinary skill will appreciate that some or all of the operations may be executed in a different order, be combined or omitted, or be executed in parallel.

At operation 302, an object selection is detected. From operation 302, the method flows to operation 304, where a classifier is utilized to determine a category for the object (e.g., purse, white purses). In some implementations, the categories might be rather broad, such as purse, or more specific, such as a luxury hand purse with gold accents. In some example embodiments, there are a hierarchy of categories, and the product may go through several classification processes for increasingly narrower categories until the final category is identified. In other example embodiments, there may be one level of classification.

At operation 306, a fine-grained search (e.g., classification) within the category is performed. In some example embodiments, operation 304 may be optional and the fine-grained classification may be performed without the previous classification into a category. The advantage of narrowing searches to a given category is that the search may be more accurate when there are fewer possibilities for classification when utilizing the fine-grained search. In other example embodiments, further classification may be performed into sub-categories to reduce the scope (e.g., the number of classes) of the classification (e.g., the pants category may be divided into other subcategories, such as long pants, short pants, formal pants, jean pants, casual pants).

In some example embodiments the product classification 304 and the fine-grained search may be performed by respective machine-learning programs. A neural network, sometimes referred as an artificial neural network, is a machine-learning program based on consideration of biological neural networks of animal brains. Such systems progressively improve performance, which is referred to as learning, to perform tasks without task-specific programming. For example, in image recognition, a neural network may be taught to identify images that contain an object by analyzing example images that have been tagged with a name for the object and, having learnt the object and name, use the analytic results to identify the object in untagged images. A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength to activate an output.

A DNN is a stacked neural network composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input, which assigns significance to inputs for the task the algorithm is trying to learn. These input-weight products are summed and the sum is passed through what is called a node's activation function, to determine whether and to what extent that signal progresses further through the network to affect the ultimate outcome. A DNN uses a cascade of many layers of nonlinear processing units for feature extraction and transformation. Each successive layer uses the output from the previous layer as an input. Higher level features are derived from lower level features to form a hierarchical representation. The layers following the input layer may be convolution layers that produce feature maps filter results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed to map training examples to correct output. In training, if the cost function value is not within a pre-determined range, based on the known training images, a backpropagation is used, where backpropagation is a common method of training artificial neural networks that are used with an optimization method such as a stochastic gradient descent (SGD) method.

Use of backpropagation can include propagation and weight update. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

An effective image similarity metric is at the core of finding similar images. In many image similarity models, two images are considered similar as long as they belong to the same category. However, this category-level image similarity may not be sufficient for the search-by-example image search application. Search-by-example, e.g., finding images that are similar to a query image, is a function of image search engines, also referred to as visual search engines. Distinguishing a cat from a dog or a fish is simpler than distinguishing among cats from different breeds. If an image is determined to be a cat, fine-grain classification methods (e.g., fine-grained image similarity) may be utilized to determine the finer category of breed.

Regarding clothes searches, fine-grained techniques may be used to differentiate among similar items, like different types of jean pants. Many types of jeans have very similar appearance, so the fine-grained techniques are useful to differentiate between the different manufacturers and models. Some examples of fine-grained classification include bi-linear pooling and attention-based methods.

In some example embodiments, the search may utilize bi-linear models. Bi-linear modeling is a recognition architecture that consists of two feature extractors whose outputs are multiplied using outer product at each location of the image and pooled to obtain an image descriptor. This architecture can model local pairwise feature interactions in a translationally invariant manner which is particularly useful for fine-grained categorization. It also generalizes various order-less texture descriptors such as the Fisher vector, VLAD and O2P.

In another embodiment, a Recurrent Attention Convolutional Neural Network (RA-CNN) is utilized for fine-grained image recognition. RA-CNN recursively learns discriminative region attention and region-based feature representation at multiple scales in a mutually reinforced way. The RA-CNN is a stacked network which takes the input from full images to fine-grained local regions at multiple scales.

With RA-CNN, the multi-scale networks share the same network architecture yet with different parameters at each scale to fit the inputs with different resolutions (e.g., a coarse scale and a finer scale). The learning at each scale consists of a classification sub-network and an attention proposal sub-network (APN), which can ensure adequate discrimination ability at each scale to generate an accurate attended region for the next finer scale. Afterwards, a finer-scale network, dedicated to high-resolution regions, takes as input an amplified attended region for extracting more fine-grained features. Further, the recurrent network is alternatively optimized by an intra-scale softmax loss for classification and an inter-scale pairwise ranking loss for attention proposal network.

The result of the fine-grained search is the product identity, which may be displayed on the user interface.

Figure 4:
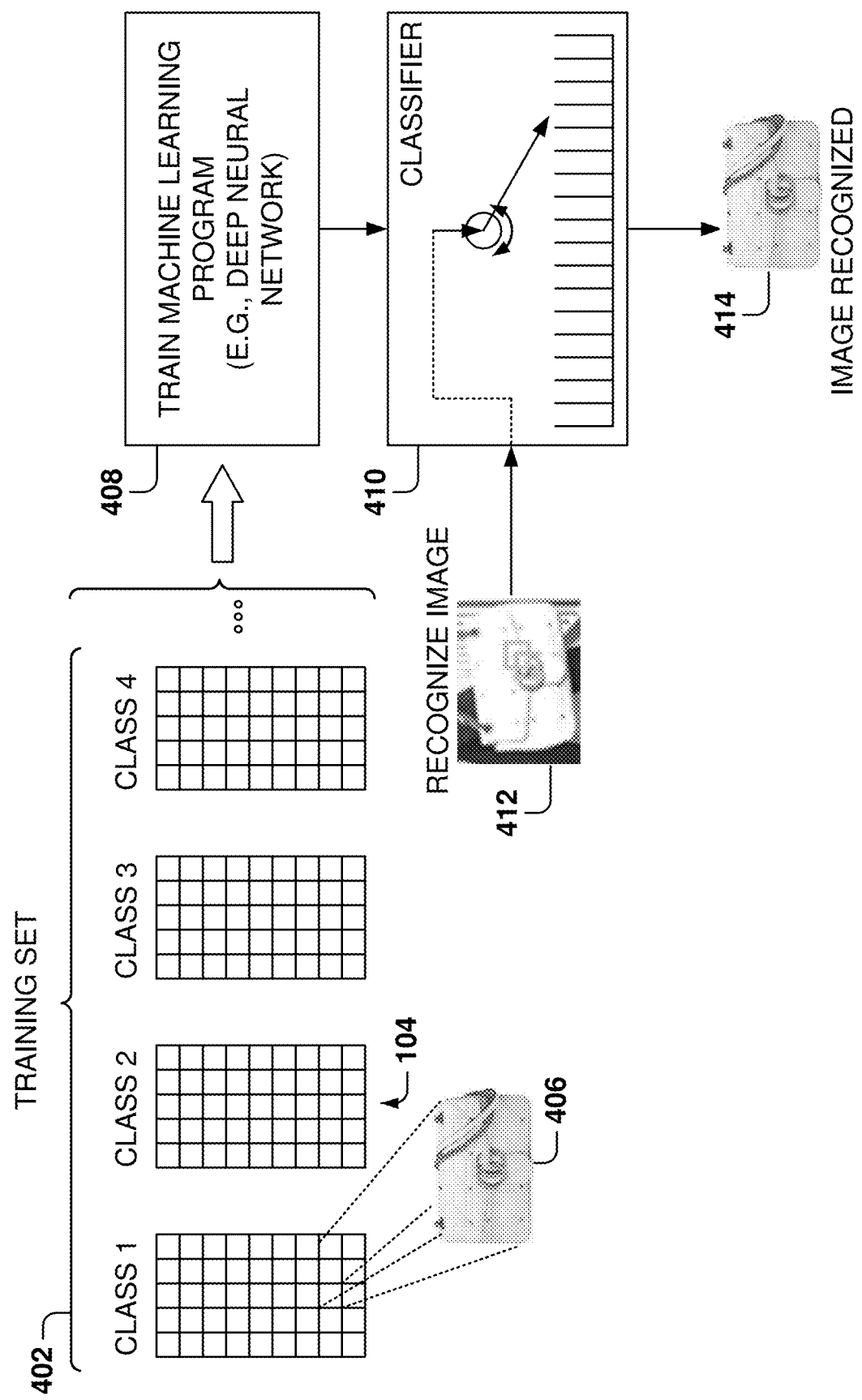
FIG. 4 illustrates the training of a classifier, according to some example embodiments.

FIG. 4 illustrates the training of a classifier for determining the product identity, according to some example embodiments. A machine-learning algorithm is designed for recognizing products, and a training set 402 includes data that maps a sample to a class 404 (e.g., a class includes all the images of purses). The classes may also be referred to as labels.

The training set 402 includes a plurality of images of for each class (e.g., image 406), and each image is associated with one of the categories to be recognized (e.g., a class). The machine-learning program is trained 408 with the training data to generate a classifier 410 operable to recognize images. In some example embodiments, the machine-learning program is a DNN.

When an input image 412 is to be recognized, the classifier 410 analyzes the input image 412 to identify the class (e.g., class 414) corresponding to the input image 412.

Figure 5:
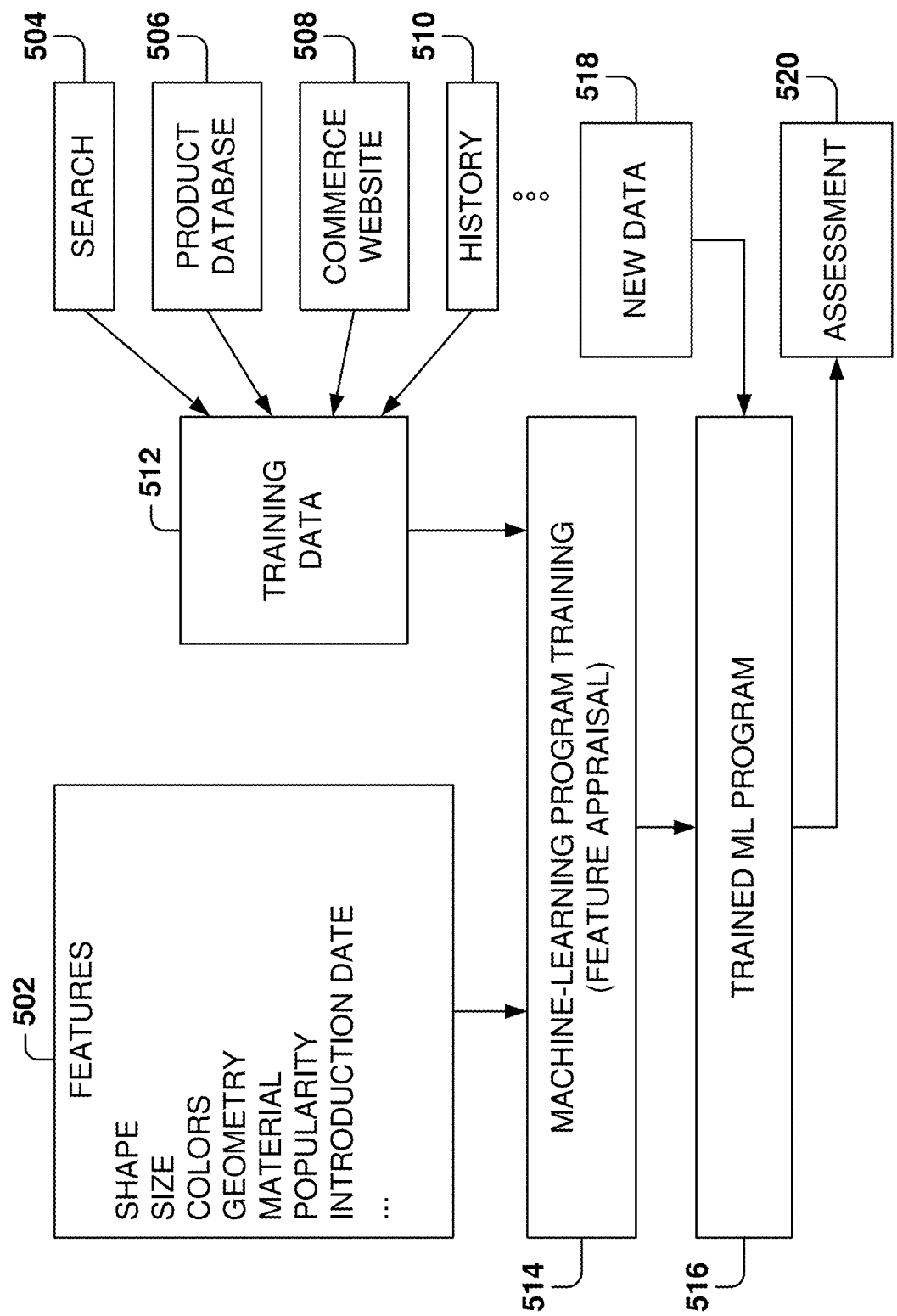
FIG. 5 illustrates the training and use of a machine-learning program, according to some example embodiments.

FIG. 5 illustrates the training and use of a machine-learning program, according to some example embodiments. In some example embodiments, MLP, also referred to as machine-learning algorithms or tools, are utilized to perform operations associated with searches, such as product searches.

Machine learning tools operate by building a model from example training data 512 in order to make data-driven predictions or decisions expressed as outputs or assessments 520. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), DNN, matrix factorization, and Support Vector Machines (SVM) tools may be used for classifying product images.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number). In some embodiments, example machine-learning algorithms provide a product identification or probabilities associated with one or more possible identifications. The machine-learning algorithms utilize the training data 512 to find correlations among identified features 502 that affect the outcome.

A feature 502 is an individual measurable property of a phenomenon being observed. The concept of feature is related to that of an explanatory variable used in statistical techniques such as linear regression. Choosing informative, discriminating, and independent features is important for effective operation of the MLP in pattern recognition, classification, and regression. Features may be of different types, such as numeric, strings, and graphs.

In one example embodiment, the features 502 may be of different types and may include one or more characteristics of the object, such as shape, size, color or colors, geometry, material, popularity among user searches, introduction date, sales figures, etc.

The machine-learning algorithms utilize the training data 512 to find correlations among the identified features 502 that affect the outcome or assessment 520. In some example embodiments, the training data 512 includes known data for one or more identified features 502 and one or more outcomes. The training data may include data obtained from text searches or image searches, product databases 506, commerce websites 508, search history 510, and others.

The search data may be associated with text searches performed by a search engine, which identifies possible results and a corresponding score, and the search data may also be associated with visual searches, which identified a plurality of images and the probabilities that each image corresponds to the search visual object. More details are provided below for visual searches with reference to FIG. 7.

In addition, the training data 512 may include label data from the product database 506. For example, the product manufacturer may provide information about its products, where the information includes one or more images of each product, pricing, description, dimensions, colors, etc. In some example embodiments, an application programming interface (API) is provided by the vendor for accessing the information in the product database 506. The information may be accessed on demand or in batch mode. In some example embodiments, all or part of the content of product database 506 is downloaded periodically from one or more database servers provided by one or more vendors.

Further, a commerce website 508 may offer a plurality of products for sale and include images for the products. The commerce website 508 may be crawled to gather product information. In some example embodiments, the commerce website is searched periodically for one or more of the fashion items being classified (e.g., products that can be identified). Thus, the product-recognition program performs a search specifying a particular product. The information returned by the commerce website 508 is then parsed and the obtained information used to update the training data and, optionally, the product information (e.g., shopping options).

History data 510 includes information regarding the history of searches by users, where the more popular products will have a higher incidence of user searches. The history data 510 may then be used a as feature for the machine-learning program.

With the training data 512 and the identified features 502, the machine-learning tool is trained at operation 514. The machine-learning tool appraises the value of the features 502 as they correlate to the training data 512. The result of the training is the trained machine-learning program 516.

When the machine-learning program 516 is used to perform an assessment, new data 518 is provided as an input to the trained machine-learning program 516, and the machine-learning program 516 generates the assessment 520 as output. For example, when an image of a product is provided, the machine-learning program utilizes the image information to determine the identity of the product. Further, the product recognition model may be used to build a product index to return information regarding buying options.

Figure 6:
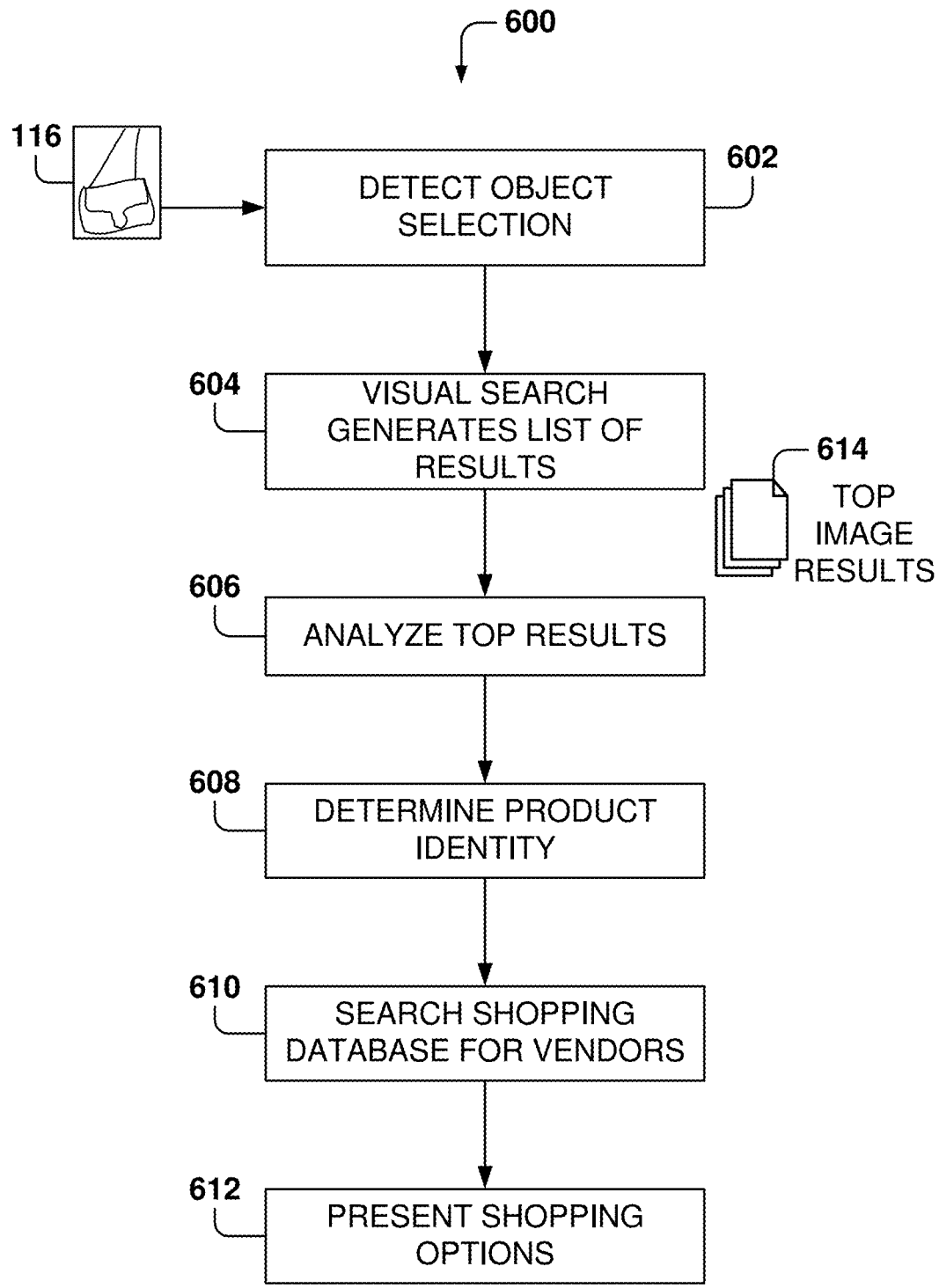
FIG. 6 is flowchart of a method for identifying shopping options based on visual searching, according to some example embodiments.

FIG. 6 is flowchart of a method 600 for identifying shopping options based on visual searching, according to some example embodiments. While the various operations in this flowchart are presented and described sequentially, one of ordinary skill will appreciate that some or all of the operations may be executed in a different order, be combined or omitted, or be executed in parallel.

At operation 602, the selection of the object is detected. From operation 602, the method flows to operation 604 where a visual search is performed for the image 116. The visual search generates a plurality of results, where each result is associated with a probability that the individual result matches the query image. In other example embodiments, a sorted list based on the probability of matching the query image is provided as the result. In other example embodiments, the results are ranked but a probability is not assigned to the results, e.g., each of the top n results are counted the same for determining the identity of the product (e.g., voting mechanism).

At operation 606, the results from the visual search are analyzed. Each result includes an image and the product identification associated with the image, where the result may also include other related information. In some example embodiments, a predefined number of top results (e.g., top n results) is used for the analysis. For example, the analysis may include the top 10 results, but other embodiments may utilize a number in the range from 1 to 50 or more.

Based on the top image results 614, the product identity is determined at operation 608. In some example embodiment, a voting method may be utilized, such as the product that occurs more often within the top image results 614 is considered the result of the product identification.

In some example embodiments, a threshold is identified, such that the number of positive matches for one product has to be above the predetermined threshold to be considered a match. If no result reaches the threshold, then the product is considered to not have been identified. For example, if the threshold is set at three, the top image results 614 have to include three or more results corresponding to one product in order to determine a positive identification.

After the identity has been determined at operation 608, the method flows to operation 610 where a shopping database is searched to find purchasing options for the user. At operation 612, the product information and the shopping options are presented to the user in the user interface.

In some example embodiments, results from multiple identification methods may be combined to improve accuracy. For example, parallel search operations may be performed utilizing a fine-grain classifier or a product search based on the visual search, as described with reference to method 600. If the two methods provide the same product identity, then there is a high confidence that the product has been correctly identified. In addition, one or more rules may be defined to combine the results from two or more identification methods.

For example, if two methods provide different results, the rules may specify that the identification as failed, or another rule may compare confidence levels provided by each method and then select the method that provides the highest confidence level.

Figure 7:
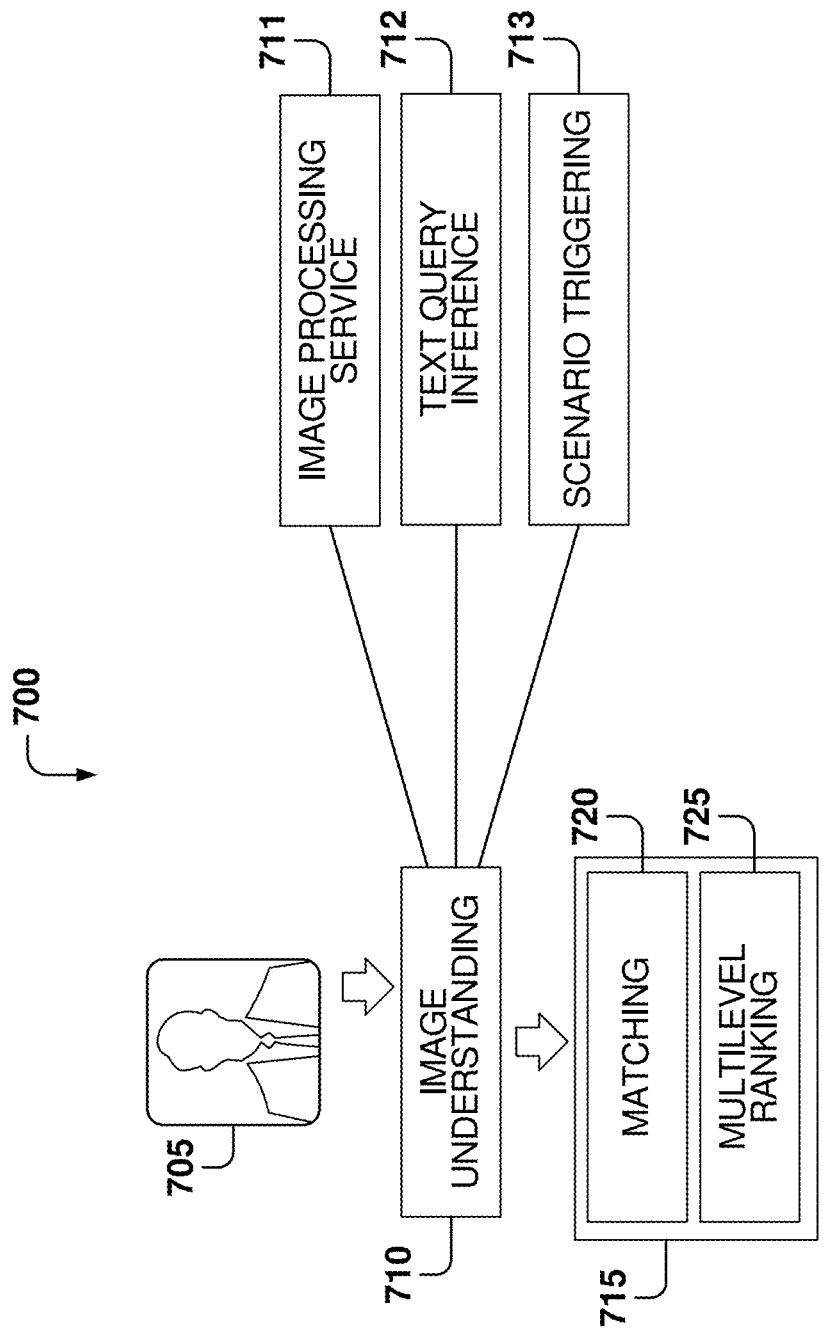
FIG. 7 shows features of a pipeline for a multi-modal visual search, according to some example embodiments.

FIG. 7 shows features of a pipeline 100 for a multi-modal visual search, according to some example embodiments. The terminology "web-scale images" is used to describe the number of images, where the number of images is comparable to that of all the images on the entire World Wide Web. It is often used in the search engine industry because that is the scale to which general search engines like Bing® or Google®. Empirically, web-scale is a number in the tens to hundreds of billions. Pipeline 700 may include a query image input 705 from a user device for search. Herein, a query image is an image that is used as a query from a device that inputs the image to a system. The system operates on the input image and provides a result to the device. The search may be conducted with respect to an index of images stored in an index database. The index images in the index database can be scraped from web pages on the Internet. The index images are part of an image index that may include billions of images, and the image index may be distributed over a number of different databases. Further, the image index can be generated from web searches that are already performed prior to the input of the query image.

Pipeline 700 may include image understanding 710 of the query image and index image selection 715, where the image selection 715 can include matching 720 and multi-level ranking 725. Image understanding 710 and index image selection 715 are realized by apparatus that include one or more processors that execute stored instructions to perform operations of image understanding, image matching, and multilevel ranking of selected images identified from the image matching.

As a first procedure in the query-image understanding process 710, an image processing service 711 is run to perform object detection and extraction of various image features. Extraction of various image features can include extraction, from the query image, of DNN features, recognition features, and additional features used for duplicate detection. Herein, DNN features refer to a vector produced by DNN, from a given image input to the DNN, to describe the content of the given image.

In image understanding 710, a next process, which may be subsequent to image processing service 711, can include text query inference 712. Here, a best text query may be generated to represent the input image, such as a "best representative query" (BRQ). A BRQ may identify a minimal and human-readable set of terms that can identify the key concept in the image. BRQs are used in a Bing® image search, where Bing® is a web search engine owned and operated by Microsoft Corporation®. Various APIs are available via a Bing® image search product. Text query inference 712 can operate on a caption associated with a web page. In various embodiments, web page text metadata associated with the query image is used to generate a text query to describe the image query.

In image understanding 710, a scenario triggering 713 may be run, for example subsequent to text query inference 715. Scenario triggering 713 can include triggering a model to identify different scenarios for search by image. Scenario triggering 713 may include features from triggering operations used in search engines. For instance, when a shopping intent is detected from the query image, searches are directed to show a specific experience, rich in a particular segment of shopping. The shopping intent may be determined from training classification of objects in the query image. For a triggering model, a high-level classification model is built to trigger different scenarios. If shopping intent is detected in the query image, scenarios related to shopping are triggered. If research on a specific topic is detected in the query image, scenarios related to the specific research topic are triggered. The triggering can identify material in the index of images against which a comparison with the query image is made.

Once the image understanding phase is complete, matching 720 of image selection 715 is entered. In order to implement search by image inside of an existing index serve stack designed mostly for text search, such as Bing index serve stack, a text-like representation for the image feature vector is generated. To accomplish this search, a technique known in the vision area as visual words is employed. This technique allows a system to quantize a dense feature vector into a set of discrete visual words, which are essentially a clustering of similar feature vectors into clusters, using a joint k-means algorithm. The visual words are then used to narrow down a set of candidates from billions to several millions.

After the matching process 720, a stage of multilevel ranking 725 is entered. In various embodiments, a Lambda-mart algorithm is used as a ranker of candidate index images. A Lambda-mart algorithm is a known algorithm that is a multivariate regression tree model with a ranking loss function. Various features may be used to train the ranker. These features can include multiple product quantization (PQ) features based on different training data, network structure, and loss functions. The features used in a PQ procedure can be derived from multiple DNN feature trainings using one or more of different DNN network structures, different loss functions, and different training data. The set of features can include category matching, color matching, matching face-related features. The set of features can also include text matching features, such as but not limited to, a BRQ query and matching a document stream.

In a first level of ranking, one feature of the candidate index images is used to reduce the number of candidate index images. In the next level of ranking, a large number of features is included, for example but not limited to thousands of features. For this level of ranking, a process can include one or more of the PQ feature, some category matching, and the image caption. PQ features can provide an efficient mechanism to speed up calculations in which millions of image candidates can be ranked based on feature vector distances. A PQ procedure can allow for image searching to be performed in real-time. With respect to signal processing and data processing, by real-time is meant completing some signal/data processing within a time that is sufficient to keep up with an external process, such as conducting an image search on a query image received from a communication channel in an acceptable user timeframe such as, but not limited to, a range within a second. In various embodiments, an algorithm called Optimized Product Quantization is used.

A high-dimensional vector may be decomposed into many low-dimensional sub-vectors to form a PQ vector. A calculation of a sub-vector with a cluster codebook is used to generate a nearest centroid of a number of elements, where a codebook is a set of codewords. After quantization is complete, distances between the query-image and result-image vectors are calculated. A Euclidean distance calculation can be conducted. However, in various embodiments, instead of using a conventional Euclidean distance calculation, a table lookup against a set of pre-calculated values is performed to accelerate the search process.

For example, a target is defined to assign 25 bytes for each 100-dimensional DNN encoder from the index images. In a first step of a training algorithm, each 100-dimensional DNN encoder is divided into 25 four-dimensional vectors. In another step of the training algorithm, for each four-dimensional vector, a k-means clustering algorithm is run, and 256 codebooks are generated. For new 100-dimensional DNN encoders, each new 100-dimensional DNN encoder is divided into 25 four-dimensional vectors. For each four-dimensional vector, the nearest codebook identification (ID) is determined. Each DNN encoder can be represented by 25 codebook IDs of 25 bytes forming a PQ vector.

In some example embodiments, conducting an image search includes receiving a query image followed by the generation of features from the query image. The features include information from text associated with the query image and a visual appearance of the image. Generating features from the query image can include applying the query image to a deep neural network to extract a set of deep neural network features from the query image. The deep neural network may be realized by a number of different types of deep neural networks.

Further, a set of visual words representing the query image is generated from the generated features and the visual words of the query image are compared with visual words of index images. The visual words of the query image can be compared with visual words of index images of an image index database by comparing DNN vectors of index images with a DNN vector of the query image. Further, a set of candidate images is generated from the index images resulting from matching one or more visual words in the comparison.

A multi-level ranking is conducted to sort the candidate images of the set of candidate images. Conducting the multi-level ranking can include decomposing a deep neural network query image vector generated from the query image into a number of sub-vectors to form a product quantization vector of the query image; and for each candidate image of the set of candidate images, decomposing a deep neural network candidate image vector generated from the candidate image into a number of sub-vectors to form a product quantization vector of the candidate image; and calculating a distance between the product quantization vector of the candidate image and the product quantization vector of the query image. Such methods can include generating a reduced set of candidate images from the set of candidate images using the distances corresponding to each of the candidate images of the set of candidate images, and using the reduced set of candidate images to provide the return results of the multi-level ranking to the user device. Calculating the distance between the product quantization vector of the candidate image and the product quantization vector of the query image can include performing a table lookup of pre-calculated values. Further, the results of the multi-level ranking are returned to the user device.

Figure 8:
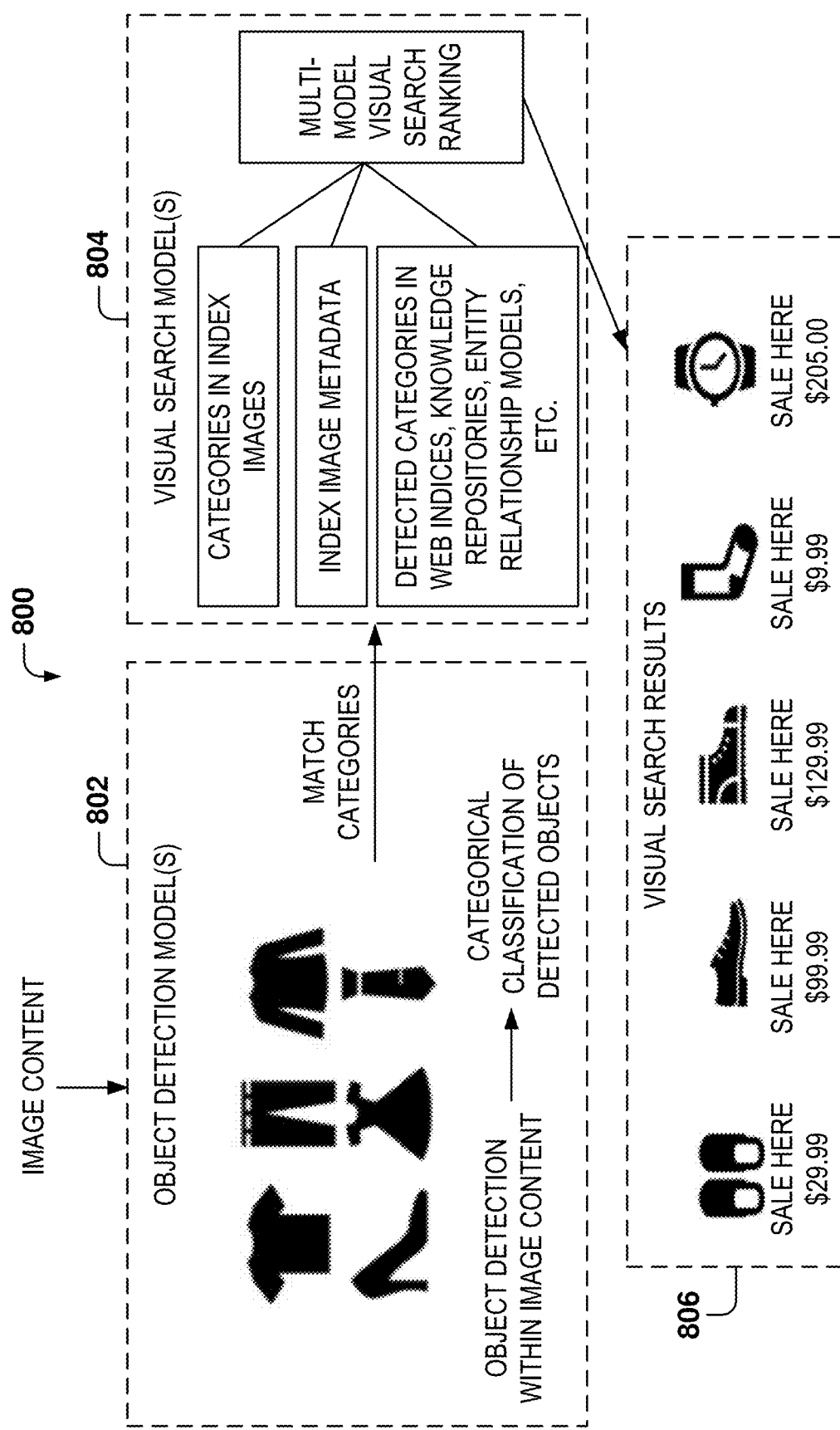
FIG. 8 illustrates object detection and categorical classification of objects within images, according to some example embodiments.

FIG. 8 illustrates object detection and categorical classification of objects within images, according to some example embodiments. FIG. 8 illustrates process flow 800, which diagrams processing by an example object model, visual search processing (including implementation of an adapted visual search model), and generation of contextually relevant visual search results for detected objects.

In process flow 800, image content is accessed by an example object detection model 802. Image content may comprise one or more image files, for example, that are stored in a memory of a computing device and/or a distributed network storage (and accessed via a client computing device). Context data (or context for the image content) may comprise signal data that accompanies the image content. Context data may be in the form of metadata that is directly associated with the image content (properties, tagging, fields, storage location (e.g., folders, labels)), capture of the image content (e.g., timestamp data, geo-locational data, computing device used to capture image, application/service used to capture), modification of the image content, sharing of the image content (e.g., via social networking services) and user signal data (e.g., user profile data), among other examples. Image content and associated context may be detected by or propagated to an example object detection model 802.

An object detection model 802 is a trained data model (or models) implementing a state-of-the-art framework for object detection that is configured to execute processing operations related to detection and classification of objects within an image. State-of-the-art object detection networks depend on regional proposed algorithms to hypothesize object locations, object bounds and the nature of objects at positions within image content. An example object detection model is an underlying detection model for visual search processing that enhances processing efficiency of visual search processing by utilizing categorical object classifications to identify contextually relevant content for a detected object. Objects may relate to any visible content including: physical objects, and nouns/pronouns such as people, animals, places, things, languages, etc. As an example, the object detection data model 802 may be a trained neural network model (e.g., artificial neural network (ANN), convolutional neural network (CNN), DNN) or other types of adaptive or deep machine-learning processing. Methods and processing for building, training and adapting deep learning models including building of feature maps.

An example object detection model 802 is implemented to detect bounds of objects within images as well as categorically classify detected objects within the image content. Classification of objects may be achieved through generation and application of one or more feature maps that intelligently apply training data to evaluate image content, detect objects within the image content and generate categorical classifications for the detected objects. An example feature map is a function that maps data vectors to feature span in machine learning modeling. In examples described herein, feature maps are generated to train example classifiers and enhance data modeling processing for object detection and classification (e.g., per-region analysis of image content). Example data modeling may be trained to generate feature maps specific to: feature extraction, object detection and object classification, among other examples, where feature maps may be shared between neural network layers (e.g., convolutional layers) to tailor data model processing for object detection-specific evaluation of image content. In examples described herein, propagation of features maps of the object detection model 802 to a visual search processing model may assist with adaption of a visual search model for object detection evaluation including classifier training.

In addition to object detection processing, an example object detection model 802 is configured to generate example categorical classifications for specific objects within image content. Example categorical classifications may comprise hierarchical classifications of a detected object that can be used to retrieve, curate and surface content that is most contextually relevant to a detected object. Detected objects may be classified at one or more levels of hierarchical classification, for example, depending how much data is available to classify objects to specific levels during object detecting modeling. As an example, object detection modeling may identify a number of clothing items in image content, specifically focusing on image content associated with a dress. In that example, categorical classifications may comprise identification on various levels, including a general-level that the detected object is clothing, a specific-level that identifies that the clothing item is a dress, a more-specific level that identifies specific attributes about the dress (e.g., color, style, type, size), a more-refined level (e.g., specific brand of the dress, exact identification of dress), and so on. Example categorical object classification is designed to identify and propagate as detailed of a classification as possible to enhance visual search processing. In doing, so an example object detection model may classify objects based on: analysis of specific objects within image content, positioning of the objects within the image content and intent associated with the image content, among other examples. Positional data and determined intent (associated with the image content and/or specific detected objects) may further be useful to filter and rank visual search images for matching with a detected object of the image content. Further, hierarchical categorical classification of objects may further be utilized to enhance processing efficiency and productivity of applications/services at run-time. For instance, the hierarchical categorical object classifications may be surfaced to enable a user to better specify search queries, among other benefits.

In some examples, the object detection model 802 may further be configured to interface with additional components for the determination of intent associated with image content. In some examples, determination of intent may comprise evaluation of user intent associated with image content, which may be determined based on evaluation of signal data associated with image content. Intent data may be useful to assist with object detection and classification. As an example, intent may be determined from a collective evaluation of: the image content, specific objects (and positioning/regional proposal network data) within image content, relationships between objects in the image content, evaluation of signal data/metadata associated with the image content (e.g., timestamp data, geo-locational data, analysis of text/content associated with a query, annotations, user-specific data, device-specific data, among other forms of metadata). For instance, a user may have attached a comment or social media post to the image content that describes image content (and even specific objects within an image). Such data may be useful in object classification determines and may be factored into ranking/scoring for one or more of object detection and object classification. In some examples, an object detection model 802 may outsource an intent determination to components of other applications/services, which may provide probabilistic intent determinations to the object detection model 802 to enhance categorical object classification. In other examples, intent may be initially evaluated in subsequent downstream processing operations such as visual search processing. Intent determination may enhance categorical classification of objects as well as visual search processing.

Example deep-learning frameworks that may be configured as the object detection model 802 may comprise but are not limited to: Faster-R-CNN and Single Shot Multi-Box Detection (SSD), among other examples. One crucial characteristic shared by most object detection algorithms is generation of category-independent region hypotheses for recognition, or "region proposals". As compared to other frameworks where region proposals are generated offline, Faster R-CNN and similar deep-learning models speed up the process up significantly enough for object detection to be executed online. An example object detection model 802 may be configured to implement multiple networks (online) to enhance object detection processing. The object detection model 802 shares full-image convolutional features between a Region Proposal Network (RPN) and an object detection network. The object detection model 802 may be configured to implement an RPN, which takes shared feature maps as input and outputs a set of rectangular region proposals. The output of this processing (e.g., rectangular region proposals) as well as the example feature maps are propagated to an example detection network. The detection network is trained to map region-specific features for category prediction. The detection network further detects final object positions as well as category assignments (e.g., categorical object classifications) for detected objects and propagates that data for visual search modeling 804.

In one example, an application/service may interface with an example object detection model 802 through an API. Moreover, exposure of the object detection model 802 comprises providing an up-to-date object detection model. The object detection model 802 may be continuously trained and updated to provide application/services with the highest precision and highest recall for object detection and classification in a scalable form. For instance, an example object detection model 802 may be a component that is accessed (e.g., through one or more APIs) by an application/service, that ultimately surfaces a representation of a detected object. A representation of a detected object may comprise one or more of: visual identification/tagging of a detected object (e.g., categorical classification(s) for a detected object), presentation of contextually relevant visual search results or suggestions for a detected object and/or surfacing of an example bounding box for a detected object, among other examples.

Categorical object classification generated by an example object detection model 802 enhances searching and annotation during visual search processing including retrieval and filtering of relevant result image content and further ranking of result image content. Processing efficiency during visual search processing is greatly improved, for example, through running online object detection models on billions of images in an image index (or indices), and storing the extracted features and categorical classification for detected objects. Among other technical advantages, visual search processing may recognize a reduction in latency during processing as well as improved accuracy and relevance during visual search analysis. This will lead to better object level matching for the query and index, and thus helps to achieve more accurate visual search ranking.

An example object detection model 802 is configured to determine an example bounding box for a detect object (or objects) within image content. An example bounding box corresponds to a set of rectangular region proposals generated through RPN data processing. Examples described herein are not limited to rectangular-shaped region proposals, as it is intended to be understood that an RPN network may be programmed to generate other types of shapes for region proposals of detected objects. More specifically, the object detection model 802 is applied to both the image content (e.g., query image) and index images (associated with one or more indices of the object detection model 802) to extract both the object categories (i.e., categorical object classifications) and feature vectors that represents the object in the detected bounding box. The feature vectors from both ends are propagated to the visual search model 804, for example, to enhance filtering learning and ranking learning executed during visual search processing. In addition to improving processing efficiency during visual search processing, propagation of such example data also enables identification and surfacing of richer representations of the images.

Results from processing by the object detection model 802 as well as the image content may be propagated to the visual search model 804. The visual search model 804 may comprise one or more components that are configured to execute visual search and annotation processing.

The visual search model 804 may comprise access to one or more visual indexes (e.g., databases) that are utilized to match image content (or portions thereof) to existing image content. Visual search analysis methodologies may comprise one or more of: nearest neighbor visual search analysis, image classification (e.g., categorical image classification) analysis and/or instance retrieval analysis, among other examples.

Visual search processing may further comprise annotating accessed image content based on execution of one or more visual search analysis methodologies. Other examples of databases, indices and knowledge repositories that may be accessed for visual search and entity annotation comprise but are limited to: entity answer databases/knowledge graphs, question and answer applications/services, image insight analysis applications/services, video detail analysis applications/services, bar code recognition applications/services, optical recognition applications/services and social networking applications/services, among other examples.

For common visual search systems, the source of a visual search index comprises a growing number of internet images. However, in previous implementations of visual search systems, there may be a large number of object level visual search queries, but most of the index images are not classified at the object level. This is because most visual search indices are geared toward image classification rather than object classification. This may limit accuracy and relevance when dealing with specific objects and relevance. Processing described herein is configured to adapt visual search processing for evaluation of index images at the object level, where an example visual search model 804 is adapted for filtering and ranking of contextually-related content based on example categorical object classifications and other associated data (e.g., feature maps, intent, bounding box identification, contextual signal data and analysis) propagated by an example object detection model 804.

To further grow an example visual search index (or indices) with object level images, object detection processing results are applied on newly crawled interest image content to extract high quality object snapshots (i.e., object-specific snippets). When content, identified at an object level, is collected, example visual search processing may further be enhanced by combining such content (object-specific snippets) with associated web page meta data. The object snippet and associated metadata may be stored as a new source of index growth for visual search indices. These newly generated object images are used to enhance precision and relevance when the search query is also an object, especially in instances where portions of image content (e.g. regions of image content that may be associated with detected objects) are being matched with cropped visually similar image content. Object-specific indices may be specifically searched during at the time of visual search processing, used to train/curate image content in other visual search indices and/or used to rank visually similar images.

As identified above, data propagated by the object detection model is used to enhance content retrieval and filtering of image content through visual search processing. Categorical object classifications, provided by neural network image classifiers (e.g., implemented by the object detection model 802) are important features, and are stored in indices for not only content retrieval but also ranking of retrieved content. Object detection provides not only more accurate localization of an example bounding box for a detected object but also provides more precise object category description that can improve searching and filtering of image content during visual search processing.

Categorical classification of detected objects, propagated from the object detection model 802, may be matched with categorical data that is identified during visual search processing. This may enhance content retrieval to capture more contextually relevant image content, during searching, for a detected object. As referenced above, the visual search model 804 is configured to match categorical classification of detected objects with categorical data associated with index images identified through search of a visual search index or indices. Moreover, the categorical object classification (e.g., object categories) given by the object detection model may also be used to match text from the web page metadata. In an example visual search system, an image index stores not only the feature vectors extracted from and representing the images, but also the metadata such as surrounding texts, product information, and related description from the webpage containing the image. In one example, such data is stored in a representative data unit of an index, where the data unit may be referred to as a "nodule." Processing operations described herein may be configured to apply Natural Language Processing (NLP) technologies to extract representative and compact text information, or entities, from the web page metadata, nodules, etc. This may further enhance content retrieval and ranking of retrieved content. Moreover, categorical object classifications may further be matched with detected categories in other indices, accessed across the web, including but not limited to: search engine indices, knowledge repositories, entity relationship models/databases, or the like. This may further extend the pool of contextually relevant image content to associate with a detected object.

The visual search model 804 may further execute filtering processing operations to filter content retrieved from visual search processing. For example, retrieved image content that is visually similar and contextually relevant to the initial image content may be filtered. Filtering processing operations, executed by the visual search model 804, may comprise but are not limited to: sanitization processing (e.g., removal of unwanted or explicit image content), de-duplication processing (e.g., removal of duplicative image content) and ranking processing. General processing for such filtering operations are known to one skilled in the field of art.

With respect to ranking, the visual search model 804 is configured to implement multi-modal visual search ranking. In doing so, an example visual search model 804 is configured to evaluate the image content for relevance from multiple perspectives (e.g., categorical classification matching of index images, categorical classification of metadata associated with index images, categorical classification retrieved from other indices, knowledge repositories). Such features are extracted via processing by an example object detection model 802 and used to adapt the visual search model 804 for object detection classification processing. As identified above, categorical object classification may comprise hierarchical levels of object analysis, which may be further utilized to improve ranking processing. Compared with existing solutions for visual search ranker training, features extracted by an example object detection model 802 (or models) contain more accurate shape and location information of the object, as well as rich contextual information.

Moreover, an example object detection model 802 may be configured to propagate detected information including layers of output feature maps for multi-modal ranking training of a ranker utilized for visual search processing. In one example, the object detection model 802 may be applied to both a query image as well as indexed images to extract both object categories and feature vectors that represents the object in the detected bounding box. Feature vectors from query-side image content as well as indexed image content may be fed into ranker learning to tailor a visual search ranker for object classification evaluation. This may enable visual search processing to identify and output visual search results 806 that are more contextually relevant to a detected object as well as provide richer representations of image content (as compared with general image classification processing), among other technical advantages.

In present examples, since metadata is stored at different (object classification) levels of hierarchy, object detection category matching can be applied to different levels of classification during ranking processing. For example, categorical object classification may be applied as BRQ to match page text and metadata. Alternatively, categorical object classification may be used as a filter set and L1/L2 ranking may be applied to further filter out semantically irrelevant documents and enhancing ranking results relevance. Further, candidate for visual search results 806 may be ranked not only based on relevance to a detected object but also relevance to the image content as a whole. Preliminary empirical research indicates example ranking processing shows greater gains in accuracy and relevance (e.g., as measured by Discounted Cumulative Gain (DCG) or the like).

The visual search model 804 is configured to output a ranked listing of visual search (image) results 806. Example visual search results 806 comprise one or more visually similar images for a detected object, where visually similar images may be surfaced as visual search results based on ranking processing executed by the visual search model 804. Any number of results may be selected for output from the visual search results 806, for example, based on application/service processing, available display space, etc. Image content in visual search results 806 is contextually relevant for one or more detected objects within example image content. Visual search results 806 may vary depending on detected objects within image content as well as determined intent associated with the image content (e.g., from a query, user-signal data, device signal data). For instance, if the user is looking for outfit inspiration in a search engine, processing described may be utilized to predict the search/shopping intent of users, automatically detect several objects of user interests and marks them so users don't have to manipulate a bounding box associated with the object as in existing techniques, execute further queries, etc.

Furthermore, in some instances, the visual search model 804 may be further configured to generate a representation of a detected object (or objects). In other examples, the visual search model 804 is configured to propagate visual search results 806 and other associated data to an example application/service (e.g., productivity service) for generation of a representation of one or more detected objects through a user interface of the application/service. A representation of a detected object may comprise one or more of: visual identification/tagging of a detected object (e.g., categorical classification(s) for a detected object), presentation of contextually relevant visual search results or suggestions for a detected object and/or surfacing of an example bounding box for a detected object, among other examples.

Figure 9:
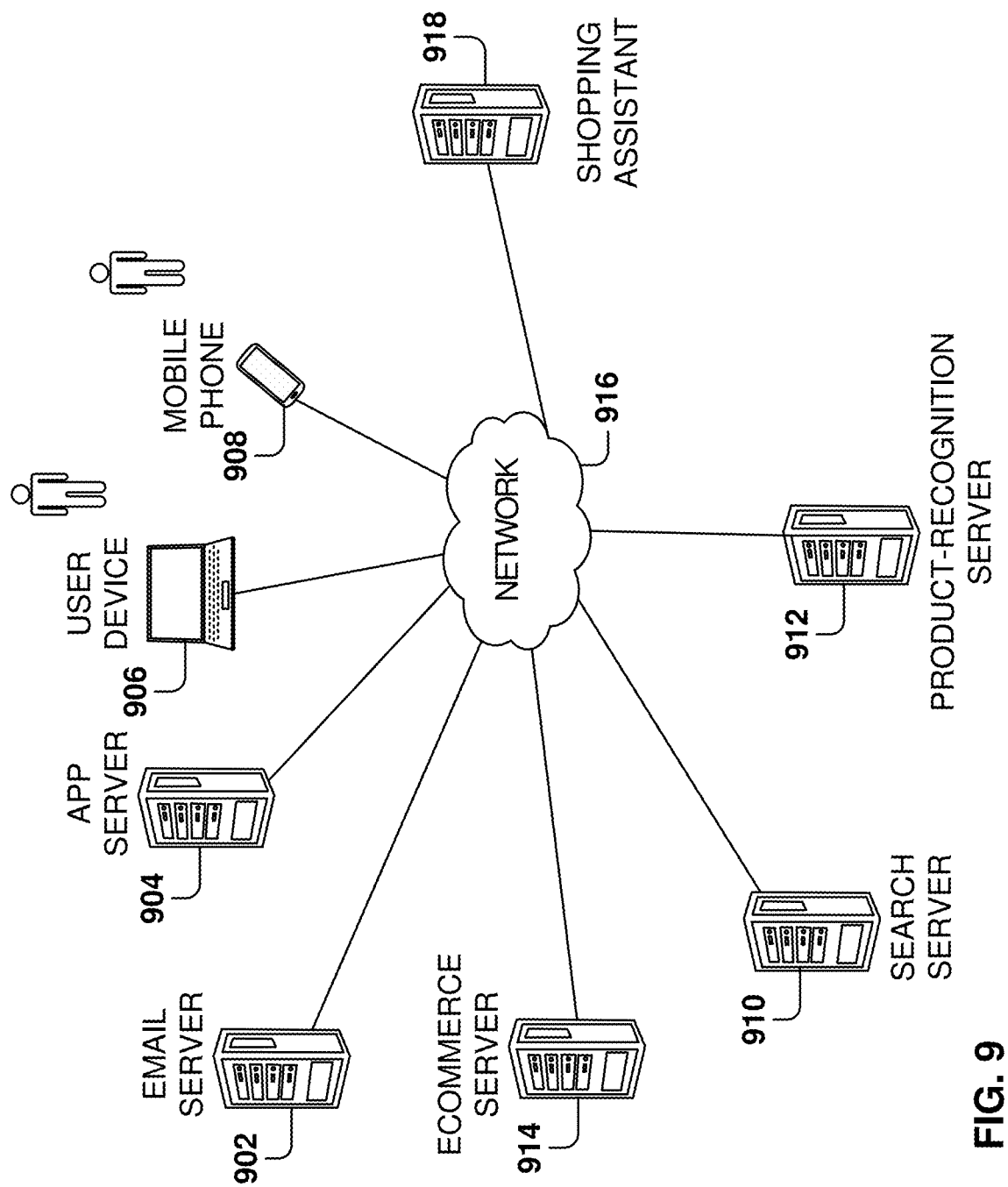
FIG. 9 is an architecture of a system for implementing product identification, according to some example embodiments.

FIG. 9 is an architecture of a system for implementing product identification, according to some example embodiments. The product-recognition server 918 gathers communication information from a plurality of sources, which include, at least, an email server 902, and application server 904, a user device 906, a mobile phone 908, an ecommerce server 914, a search server 910, a shopping assistant server 918, and so forth.

The email server 905 may be accessed to check for new emails, and the application server 904 may be accessed to get application messages (e.g., Skype®, WhatsApp®). The user device 906 and the mobile phone 908 may be utilized by user to access the product-recognition server 912 in the shopping assistant 918. The e-commerce server 914 may be utilized for shopping for identified products, and the search server 910 provides us search capabilities, both textual searches individual searches.

The product recognition server 912 may be accessed for recognizing products within images, as discussed above with reference to FIGS. 1-8. Further, the shopping assistant 918 interacts with the product-recognition server 912 to provide shopping options for the identified products.

Figure 10:
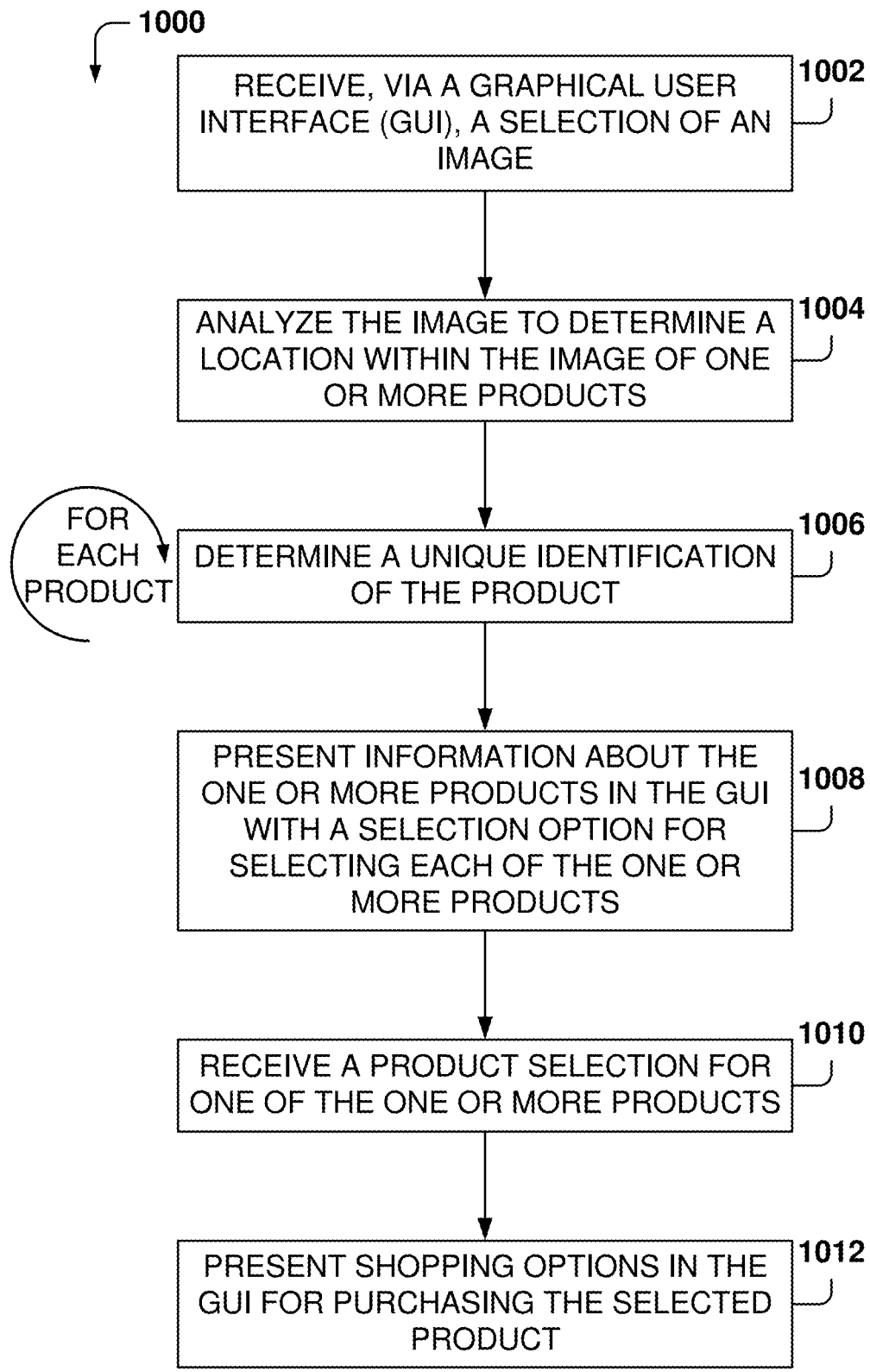
FIG. 10 is a flowchart of a method for identifying the brand and model of products embedded within an image, according to some example embodiments.

FIG. 10 is a flowchart of a method for identifying the brand and model of products embedded within an image, according to some example embodiments. While the various operations in this flowchart are presented and described sequentially, one of ordinary skill will appreciate that some or all of the operations may be executed in a different order, be combined or omitted, or be executed in parallel.

Operation 1002 is for receiving, via a GUI, a selection of an image (e.g., image 104 in FIG. 1). From operation 1002, the method flows to operation 1004 for analyzing, by one or more processors, the image to determine a location within the image of one or more products. See for example, bounding box 106 in FIG. 1 identifying the location of a pair of shoes.

Operation 1006 is performed for each product in the image, where the one or more processors determine a unique identification of the product that includes a manufacturer of the product and a model identifier.

From operation 1006, the method flows to operation 1008 for presenting, by the one or more processors, information about the one or more products in the GUI with a selection option for selecting each of the one or more products.

At operation 1010, the one or more processors receive a product selection for one of the one or more products. From operation 1010, the method flows to operation 1012 for presenting, by the one or more processors, shopping options in the GUI for purchasing the selected product.

In one example, determining the unique identification of the product further includes utilizing a machine-learning classifier for visually recognizing image data associated with the product.

In one example, the machine-learning classifier is trained with labeled data, the labeled data including one or more of information from a vendor's database, a product database, or information gathered from a shopping website.

In one example, determining the unique identification of the product further includes utilizing neural network classifiers with bi-linear pooling for visually recognizing image data associated with the product, the bi-linear pooling including two feature extractors whose outputs are combined to obtain an image descriptor.

In one example, determining the unique identification of the product further includes performing an image search of image data associated with the product, the image search producing a plurality of results, and determining the unique identification of the product based on a plurality of top results from the plurality of results.

In one example, determining the unique identification of the product based on a plurality of top results further includes determining the plurality of top results as a predetermined number of results having a highest probability of being a match for the product, and using the plurality of top results as votes to determine a product with a highest number of matches within the top results.

In one example, analyzing the image to determine the location within the image of the one or more products further includes identifying a bounding box within the image for each of the one or more products.

In one example, presenting information about the one or more products in the GUI further includes presenting a model number next to each of the one or more products, and presenting, for each of the one or more products, a bounding box within the image.

In one example, analyzing the image to determine the location within the image of one or more products further includes training a machine-learning program to generate feature maps for feature extraction, object detection, and object classification.

In one example, presenting the shopping options further includes presenting, for each shopping option, one or more of a shopping website link, a shopping website link, and a price for the product.

Figure 11:
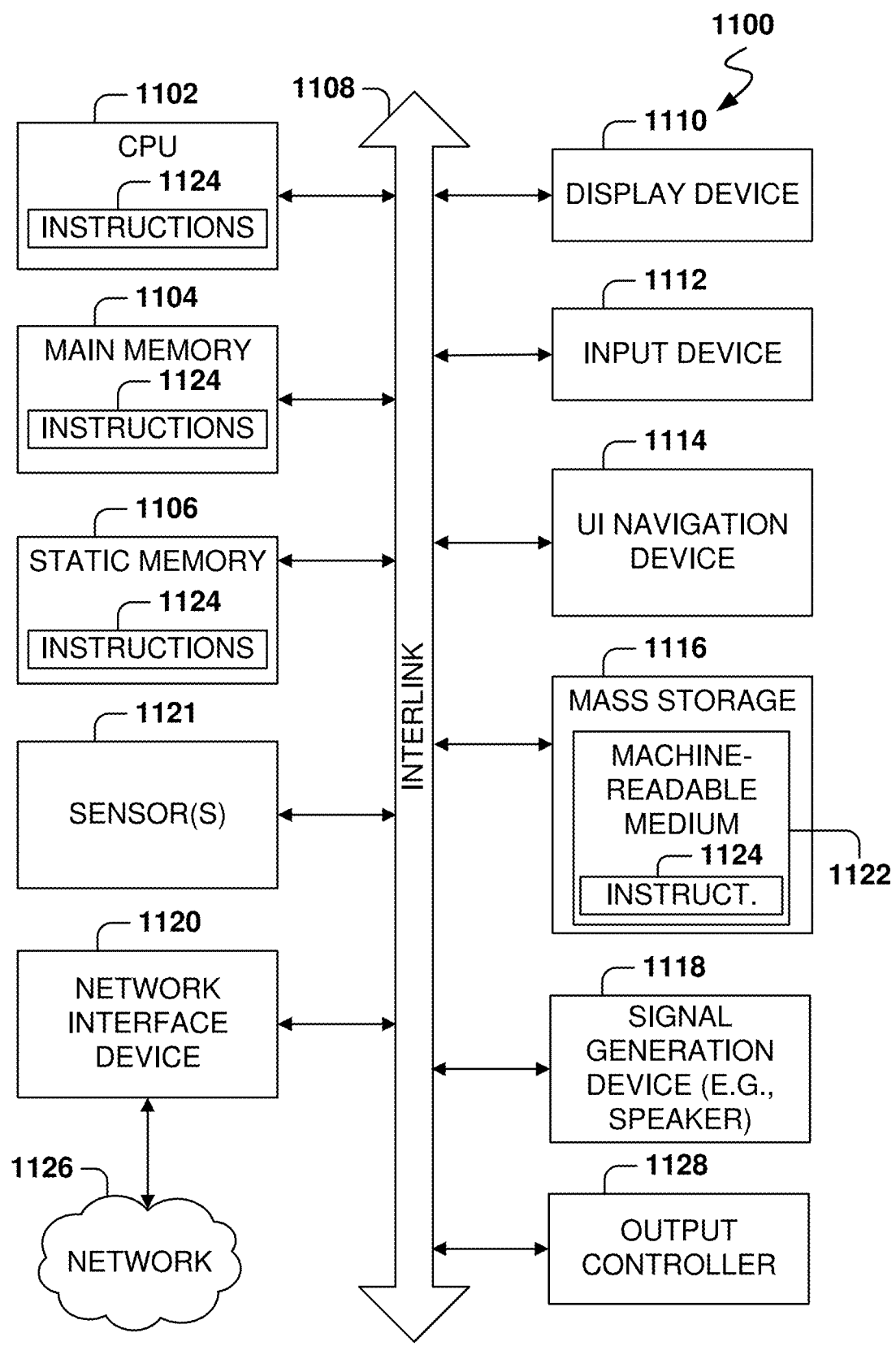
FIG. 11 is a block diagram illustrating an example of a machine upon which one or more example embodiments may be implemented.

FIG. 11 is a block diagram illustrating an example of a machine 1100 upon which one or more example embodiments may be implemented. In alternative embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environment. The machine 1100 may be a personal computer (PC), a tablet PC, a set-top box (STB), a laptop, a mobile telephone, a web appliance, a network router, switch or bridge, or any machine capable of executing instructions (sequential or otherwise) that specify actions to be taken by that machine. Further, while only a single machine 1100 is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include, or may operate by, logic or a number of components or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1100 may include a Central Processing Unit (CPU) 1102, a main memory 1104, and a static memory 1106, some or all of which may communicate with each other via an interlink (e.g., bus) 1108. The machine 1100 may further include a display device 1110, one or more input devices 1112 (e.g., a keyboard, a microphone, a touchscreen, a game controller, a remote control, a camera, dedicated buttons), and one or more user interface navigation devices 1114 (e.g., a mouse, a touchpad, a touchscreen, a joystick, a gaze tracker). In an example, the display device 1110, input devices 1112, and user interface navigation devices 1114 may include a touchscreen display. The machine 1100 may additionally include a mass storage device (e.g., drive unit) 1116, a signal generation device 1118 (e.g., a speaker), a network interface device 1120, and one or more sensors 1121, such as a Global Positioning System (GPS) sensor, compass, accelerometer, magnetometer, or other sensors. The machine 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, a card reader, etc.).

The mass storage device 1116 may include a machine-readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within the static memory 1106, or within the CPU 1102 during execution thereof by the machine 1100. In an example, one or any combination of the CPU 1102, the main memory 1104, the static memory 1106, or the mass storage device 1116 may constitute machine-readable media.

While the machine-readable medium 1122 is illustrated as a single medium, the term "machine-readable medium" may include a single medium or multiple media (e.g., a centralized or distributed database, and/or associated caches and servers) configured to store the one or more instructions 1124.

The term "machine-readable medium" may include any medium that is capable of storing, encoding, or carrying instructions 1124 for execution by the machine 1100 and that causes the machine 1100 to perform any one or more of the techniques of the present disclosure, or that is capable of storing, encoding or carrying data structures used by or associated with such instructions 1124. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1124 may further be transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone Service (POTS) networks, wireless data networks (e.g., Institute of Electrical and Electronics Engineers (IEEE) 1102.11 family of standards known as Wi-Fi®, IEEE 1102.16 family of standards known as WiMax®), IEEE 1102.15.4 family of standards, peer-to-peer (P2P) networks, among others. In an example, the network interface device 1120 may include one or more physical jacks (e.g., Ethernet, coaxial, or phone jacks) or one or more antennas to connect to the communications network 1126. In an example, the network interface device 1120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions 1124 for execution by the machine 1100, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   receiving a selection of an image from a user;
   analyzing, by one or more processors, the image to determine a location within the image of one or more products;
   for each product in the image:
      present a portion of the image containing the corresponding product to a first neural network classifier to determine a category of the product; and
      utilizing a second neural network classifier for image recognition within the category of the product to obtain a unique identification of the product that includes a manufacturer of the product and a model identifier;
   presenting, by the one or more processors, a graphical user interface (GUI), the GUI comprising a first area comprising the image and a selection option for selecting each of the one or more products and a second area for presenting information about the one or more products;
   receiving, by the one or more processors, a product selection for one of the one or more products; and
   responsive to the product selection, presenting shopping options for purchasing the selected product in the second area of the GUI.

2. The method as recited in claim 1, wherein:
   the GUI further comprises a third area for presenting related products; and
   responsive to the product selection, presenting products related to the selected product.

3. The method as recited in claim 1, wherein the first neural network classifier or the second neural network classifier is trained with labeled data, the labeled data including one or more of information from a vendor's database, a product database, or information gathered from a shopping website.

4. The method as recited in claim 1, wherein the second neural network classifier comprises bi-linear pooling for visually recognizing image data associated with the product based on the category, the bi-linear pooling including two feature extractors whose outputs are combined to obtain an image descriptor.

5. The method as recited in claim 1, further comprising:
   receiving selection of a second product of the one or more products by the user;
   responsive to the selection, updating the information in the second area of the GUI to present purchase options for the second product.

6. The method as recited in claim 5, wherein the GUI further comprises a third area for presenting related products and responsive to the second product selection:
   updating information in the second area to present detailed product information of the second product; and
   updating information in the third area to present products related to the second product.

7. The method as recited in claim 1, wherein analyzing the image to determine the location within the image of the one or more products further includes:
   identifying a bounding box within the image for each of the one or more products.

8. The method as recited in claim 1, further comprising:
   presenting in the image a model number next to each of the one or more products; and
   presenting a bounding box within the image for each of the one or more products.

9. The method as recited in claim 1, wherein analyzing the image to determine the location within the image of one or more products further includes:
  training a machine-learning program to generate feature maps for feature extraction, object detection, and object classification.

10. The method as recited in claim 1, wherein presenting the shopping options further includes:
  presenting, for each shopping option, one or more of a shopping website link, a shopping website link, and a price for the product.

11. A system comprising:
  a memory comprising instructions; and
  one or more computer processors, wherein the instructions, when executed by the one or more computer processors, cause the one or more computer processors to perform operations comprising:
    receiving a selection of an image from a user;
    analyzing the image to determine a location within the image of one or more products;
    for each product in the image:
      performing an image search of image data associated with the corresponding product, the image search producing a plurality of results;
      selecting a plurality of top results as a predetermined number of results having a highest probability of being a match for the product;
      using the plurality of top results as votes to determining a unique identification of the product that includes a manufacturer of the product and a model identifier based on a product with a highest number of matches within the top results;
    presenting a graphical user interface (GUI), the GUI comprising a first area comprising the image and a selection option for selecting each of the one or more products and a second area for presenting information about the one or more products;
    receiving a product selection for one of the one or more products; and
    responsive to the product selection, presenting shopping options for purchasing the selected product in the second area of the GUI.

12. The system as recited in claim 11, wherein:
  the GUI further comprises a third area for presenting related products; and
  responsive to the product selection, presenting products related to the selected product.

13. The system as recited in claim 11, further comprising:
  receiving selection of a second product of the one or more products by the user; responsive to the selection, updating the information in the second area of the GUI to present purchase options for the second product.

14. The system as recited in claim 13, wherein the GUI further comprises a third area for presenting related products and responsive to the second product selection:
  updating information in the second area to present detailed product information of the second product; and
  updating information in the third area to present products related to the second product.

15. A non-transitory machine-readable storage medium including instructions that, when executed by a machine, cause the machine to perform operations comprising:
  receiving a selection of an image from a user;
  analyzing the image to determine a location within the image of one or more products;
  for each product in the image:
    present a portion of the image containing the corresponding product to a first neural network classifier to determine a category of the product; and
    utilizing a second neural network classifier for image recognition within the category of the product to obtain a unique identification of the product that includes a manufacturer of the product and a model identifier;
  presenting to the user a graphical user interface (GUI) having a first area, a second area, and a third area;
  presenting the selected image along with a mechanism to select each of the one or more products in the first area of the GUI;
  receiving a product selection for one of the one or more products; and
  responsive to the product selection, presenting product identification information comprising the manufacture and the model identifier and shopping options for purchasing the selected product in the second area of the GUI and presenting products related to the selected product in the third area of the GUI.

16. The non-transitory machine-readable storage medium as recited in claim 15, wherein the first neural network classifier or the second neural network classifier is trained with labeled data, the labeled data including one or more of information from a vendor's database, a product database, or information gathered from a shopping website.

17. The non-transitory machine-readable storage medium as recited in claim 15, wherein the second neural network classifier comprises bi-linear pooling for visually recognizing image data associated with the product based on the category, the bi-linear pooling including two feature extractors whose outputs are combined to obtain an image descriptor.

18. The non-transitory machine-readable storage medium as recited in claim 15, the operations further comprising:
  receiving selection of a second product of the one or more products by the user; and
  responsive to the selection, updating the information in the second area of the GUI to present purchase options for the second product.

19. The non-transitory machine-readable storage medium as recited in claim 15, wherein analyzing the image to determine the location within the image of the one or more products further includes:
  identifying a bounding box within the image for each of the one or more products.

* * * * *